United States Patent
Ahmadian et al.

(10) Patent No.: US 7,536,586 B2
(45) Date of Patent: May 19, 2009

(54) SYSTEM AND METHOD FOR THE MANAGEMENT OF FAILURE RECOVERY IN MULTIPLE-NODE SHARED-STORAGE ENVIRONMENTS

(75) Inventors: Mahmoud B. Ahmadian, Pflugerville, TX (US); Ahmad A. J. Ali, Austin, TX (US); Zafar Mahmood, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 518 days.

(21) Appl. No.: 11/330,580

(22) Filed: Jan. 12, 2006

(65) Prior Publication Data
US 2007/0174657 A1    Jul. 26, 2007

(51) Int. Cl.
*G06F 11/00*    (2006.01)
(52) U.S. Cl. ........................... 714/6; 711/114
(58) Field of Classification Search ............ 714/5, 714/6, 7, 8, 10–13; 711/114, 147, 156
See application file for complete search history.

(56) References Cited

U.S. PATENT DOCUMENTS

| | | | |
|---|---|---|---|
| 6,199,179 B1* | 3/2001 | Kauffman et al. | 714/26 |
| 6,516,425 B1* | 2/2003 | Belhadj et al. | 714/6 |
| 6,598,174 B1* | 7/2003 | Parks et al. | 714/6 |
| 6,691,209 B1* | 2/2004 | O'Connell | 711/114 |
| 6,775,794 B1* | 8/2004 | Horst et al. | 714/42 |

* cited by examiner

*Primary Examiner*—Dieu-Minh Le
(74) *Attorney, Agent, or Firm*—Baker Botts L.L.P.

(57) ABSTRACT

A storage architecture and method for managing the operation of a network in a RAID environment is provided in which a storage management agent is included in each server node of the network. The storage management agents monitor the status of the drives of the storage array in shared storage. If a storage management agent identifies a failed drive, the storage management agent monitors the rebuild of the degraded RAID volume. During the rebuild of a degraded RAID volume, the storage management agent determines if a server node has failed, and, if required, initiates the transfer of the RAID rebuild tasks of the failed server node to another server node.

20 Claims, 3 Drawing Sheets

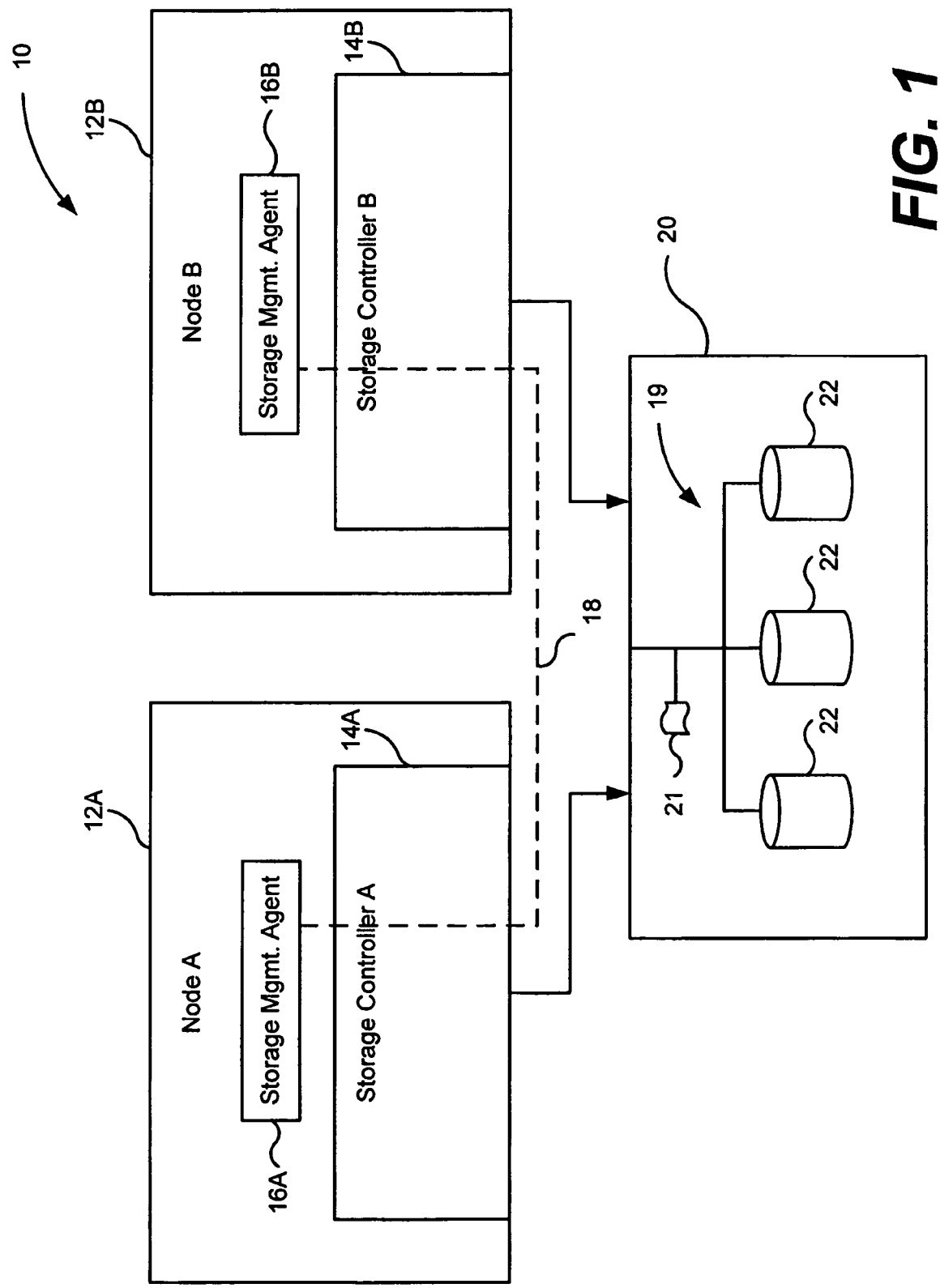

SYSTEM AND METHOD FOR THE MANAGEMENT OF FAILURE RECOVERY IN MULTIPLE-NODE SHARED-STORAGE ENVIRONMENTS

TECHNICAL FIELD

The present disclosure relates generally to computer systems and information handling systems, and, more particularly, to a system and method for the management of failure recovery in shared-storage RAID environments.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include a network in which multiple hosts are arranged as nodes in a cluster and share a set of storage resources that store data in a redundant data format, such as RAID. Each host will include a RAID storage controller. The RAID storage controllers will manage the storage resources such that each RAID volume is owned by one of the RAID storage controllers. Alternatively, the RAID volumes could be managed according to a coordinated approach in which a RAID storage controller does not have explicit and exclusive ownership over each RAID volume. If exclusive ownership over each RAID volume is not established, the responsibility for the rebuild of a degraded RAID volume may not be established, and a degraded RAID volume not may be rebuilt without manual intervention. In addition, the failure of a node or host while in the process of rebuilding a RAID volume may not be immediately recognized by the other node or host, thereby delaying or entirely preventing the RAID recovery or the rebuild of a failed drive.

SUMMARY

In accordance with the present disclosure, a storage architecture and method for managing the operation of a network is provided in which a storage management agent is included in each server node of the network. The storage management agents monitor the status of the RAID volumes of the storage volume in shared storage. If a storage management agent identifies a degraded RAID volume, the storage management agent pauses for a waiting period to determine if a rebuild of the affected drive (RAID recovery) has been initiated. If the wait period concludes without the rebuild of the drive being initiated, the storage management agent initiates a rebuild of the degraded RAID volume. The storage management agent also monitors the completion of the rebuild. If the rebuild of the failed drive is not completed before the conclusion of a waiting period, the storage management agent determines if a server node has failed, and, if required, initiates the transfer of the tasks of the failed server node to another server node.

The storage architecture and method disclosed herein is technically advantageous because it provides an additional layer of management and monitoring within the network. The architecture and method disclosed herein is able to monitor rebuild and failover functions that often occur automatically and without the supervision of a managing agent. The architecture and method disclosed herein provides a mechanism to make certain that rebuild and failover tasks are being initiated and completed. If the rebuild and failover tasks are not being initiated or completed, the storage management agent is able to take remedial action to initiate or complete the required action.

Another technical advantage of the system and method disclosed herein is that the operation of the software agents is transparent to the operation of the server nodes and the storage array. The software agents do not interfere with the operation of either the server node or the storage array. Rather, the software agents function to monitor the server node and the storage array in a supervisory role that does not interfere with the operation of the network. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is a block diagram of a network; and

DETAILED DESCRIPTION

Figure 2A:
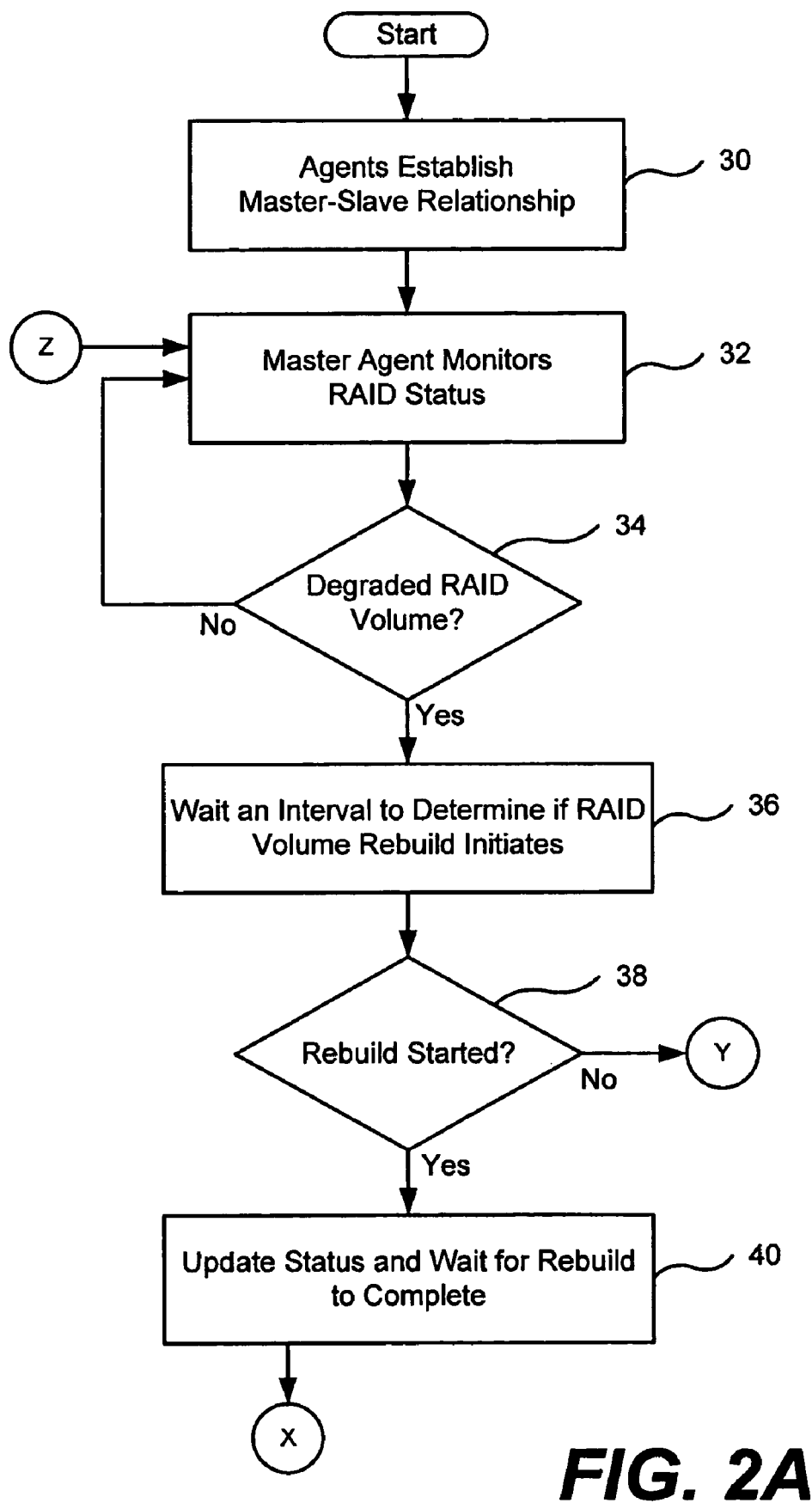
FIGS. 2A and 2B are flow diagrams of a method by which a set of storage management agents monitor the failure recovery activities in the storage array and server nodes of the network.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Shown in FIG. 1 is a diagram of a network, which is indicated generally at 10. Network 10 includes two hosts or server nodes 12. Server Node A is identified at 12A and Server Node B is identified at 12B. In the drawing of FIG. 1, the designations A and B are used to identify elements associated Server Node A and Server Node B, respectively. Server Node A and Server Node B are arranged in the form of a server cluster. A server cluster is a group of individual server nodes that are communicatively connected with one another and managed to improve the collective performance and availability of the managed set of server nodes. A cluster server provides for failover protection among the server nodes. If one server node fails, another server node can be substitute for the failed server node. In the example of FIG. 1, the server nodes communicate with one another through communications link 18. Each of the server nodes includes a RAID storage controller 14 and a storage management software agent 16.

Each of the server nodes 12 is coupled to and can communicate with shared storage, which may comprise a RAID volume 19 that includes a plurality of drives 22 arranged in a RAID configuration. In this example, RAID volume 19 is included within a storage enclosure 20. In operation, each RAID controller 14 will control one or more logical units of RAID volume 20. In operation, each storage management agent 16 monitors and manages the failover of RAID rebuild tasks of the respective RAID storage controllers 14. An instance of storage management 16 agent runs in each server node 12. The storage management agents of each node communicate and synchronize with one another through communications link 18, which may comprise any suitable interprocess communications link between two devices. Storage management agents 16 also maintain a status log in shared storage. Storage management agents 16 comprise a software program that executes on the processor of the server node.

In the architecture of FIG. 1, each of the storage management agents 16 may write to a common log 21, which is stored in a memory location in the storage enclosure that includes RAID volume 20. The function of the master storage management agents is to monitor and manage the failure recovery process in the event of a failure in a drive of a RAID volume or a failure in one of the server nodes of the network. The storage management agents may also assume master and slave roles to avoid contention and to identify that the storage management agent that is primarily responsible for monitoring failures in the network.

Figure 2B:
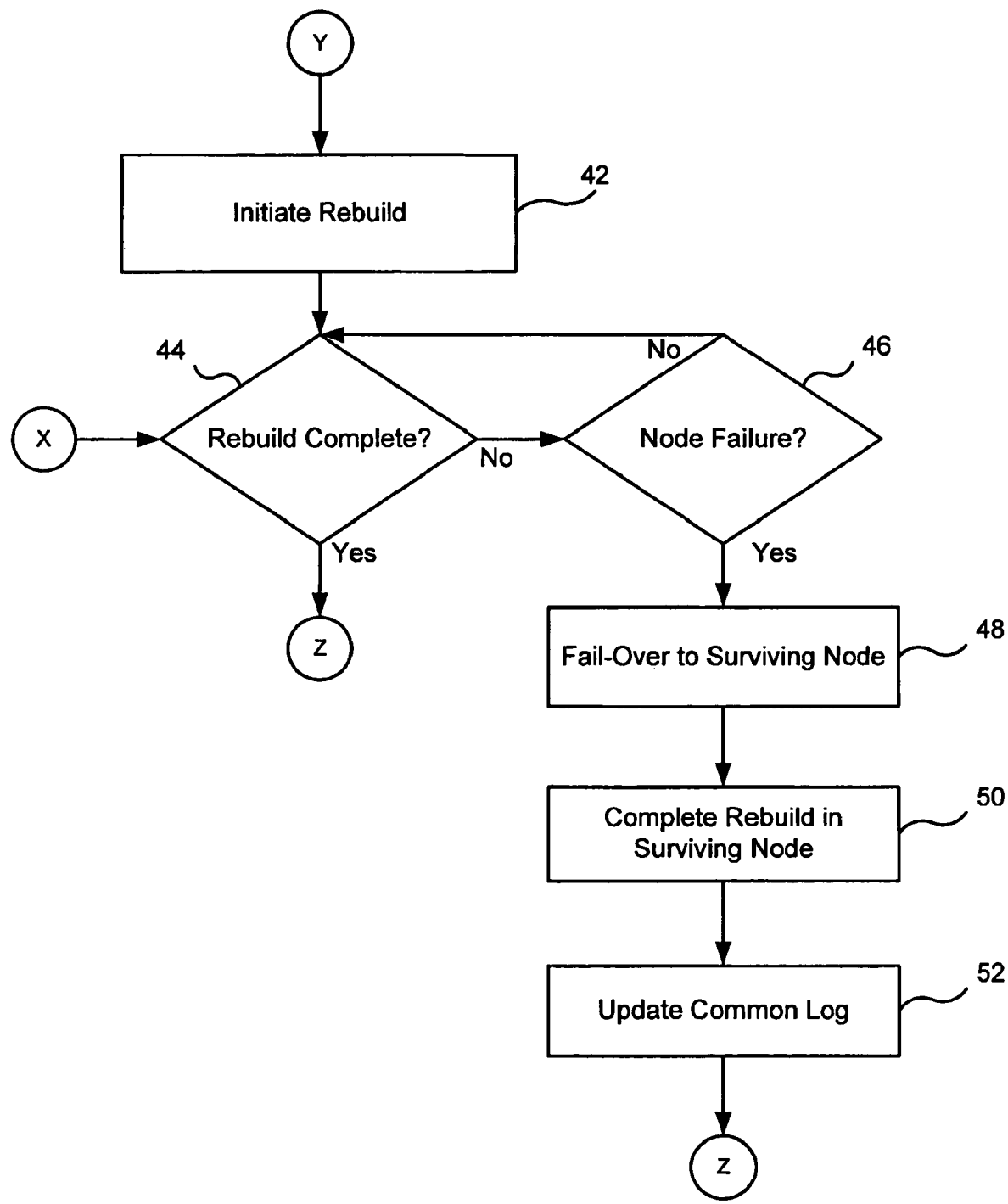

In operation, the storage management agent monitors the status of the drives of the volume to determine if any one of the RAID volumes has become degraded. Shown in FIGS. 2A and 2B is a flow diagram that depicts the method by which the storage management agents monitor and control failure recovery activities in the volume and in the server nodes of the network. Beginning at step 30, the agents determine which of the agents will be the primary or master agent. The master agent monitors the status of RAID volume 19. At steps 32 and 34, the master agent monitors the status of the RAID volumes and loops between steps 32 and 34 until a degraded RAID volume is identified. Once a degraded RAID volume is identified, the flow diagram jumps from step 34 to step 36, where the master agents waits for an interval to determine if a rebuild of the failed drive is initiated. Depending on the design and implementation of the network, the rebuild could be initiated by the RAID storage controller that owns the degraded RAID volume, a logical volume that includes the failed drive, or another drive of the RAID volume.

After the conclusion of the wait interval, the flow diagram jumps to step 38, where it is determined if the rebuild of the degraded RAID volume has been initiated. If the rebuild has been initiated, the status of the degraded RAID volume is written to the common status log 21 and the master agents enter a second wait period to permit the rebuild of the degraded RAID volume to finish. Following the completion of the wait period for the completion of the rebuild of the degraded RAID volume, the flow diagram jumps to point X at FIG. 2B, where it is determined at step 44 if the rebuild is complete. If the rebuild is completed, the flow diagram terminates at point Z, which returns the flow diagram and the monitoring process to step 32 of FIG. 2A, which involves the monitoring of the drives of the RAID volume. If the rebuild is not completed, the flow diagram continues with step 46. The failure of a rebuild to complete may be due to one or more of several reasons. The rebuild process may be lengthy or another drive may be in the process of being rebuilt at the same time, thereby delaying any other drive rebuild processes. If the rebuild process is not complete, it is determined at step 46 is a server node has failed. In some instances, the rebuild process is managed by a RAID storage controller in a server node, and the failure of the applicable server node will prevent the drive from being rebuilt. If a server node has not failed, the flow diagram loops back to step 44, and steps 44 and 46 and be continuously performed until the rebuild of the drive is complete.

With reference to FIG. 2A, if it is determined at step 38 that the rebuild of the degraded RAID volume has not started, the flow diagram proceeds to point Y in FIG. 2B, where the master agent initiates a rebuild of the degraded RAID volume at step 42. Following step 42, steps 44, and step 46 or step 30 are performed, as described above. As such, if a rebuild of the degraded RAID volume has not started within a defined time interval (steps 36 and 40), the master agents initiates the rebuild.

As described above, the failure of a node may prevent the rebuild of a drive within a RAID volume. With reference to FIG. 2B, if it is determined at steps 44 and 46 that a drive rebuild is not complete and that a node has failed, the master agent initiates a failover process to cause the functions and responsibilities of the failed node to moved to a surviving node. The functions of the failed node, including the rebuild of the failed drive, are failed-over to the surviving node. In the example of FIG. 1, assume that agent 16A is the master agent and RAID storage controller 14B is managing the rebuild of a degraded RAID volume. If it is determined that RAID storage controller 14B or node 12B has failed, the functions of RAID storage controller 14B and node 12B, including the rebuild function, will be migrated to RAID storage controller 14A and node 12A. Returning to FIG. 2B, the rebuild is completed in the surviving node at step 50 and common log 21 is updated at step 52 to reflect that the rebuild is completed and that an alternate or surviving node managed the rebuild. Following step 52, the flow diagram continues with the monitoring of the drives of the array at step 32.

Although the steps of FIGS. 2A and 2B are described with reference to the master agent, it should be recognized that each of the slave or alternate agents also monitors the status of the drives of the RAID volume. If a drives fails, each alternate agent will monitor the efforts of the master agent to manage the restoration of the degraded volume. If the master agent does not complete the restoration of the failed drive within a defined time period, an alternate agent will determine if the node of the master agent has failed. If the node of the master agent has failed, one of the alternate agents will assume the role of the master agent and attempt to complete the restoration of the failed drive.

The system and method disclosed herein provides a second layer of management for managing the rebuild of degraded RAID volumes while simultaneously monitoring the status of the nodes responsible for rebuilding the degraded RAID volume. In this manner, the drive rebuild process is monitored, and the status of the node conducting the drive rebuild process is monitored. Each node includes a software agent, and the software agents monitor the status of the master agent to insure that the node or RAID storage controller of the master agent has not also failed.

The system and method described herein is not limited to a network having the architecture of the network of FIG. 1. Rather, the system and method disclosed herein may be employed with any network having multiple nodes, each of which is able to access a set of shared storage resources. The system and method disclosed herein is not limited in its application to a system having only two nodes. The system and method could work with systems having multiple nodes, in which case a storage management agent would run on each node. Although the present disclosure has been described in detail, it should be understood that various changes, substitutions, and alterations can be made hereto without departing from the spirit and the scope of the invention as defined by the appended claims.

What is claimed is:

1. An architecture for a network, comprising:
   a first server node and a second server node, wherein each of the first server node and the second server node includes a storage controller and a storage management software agent; and
   shared storage coupled to the first server node and the second server node, wherein the shared storage includes a storage array that includes a plurality of storage drives organized as a volume;
   a communications link between each storage management software agent, wherein each storage management software agent is operable to communicate and synchronize with each other through the communications link; and
   wherein each storage management software agent is operable to monitor the status of the network and to monitor the rebuild of a degraded volume or a failed server node.

2. The architecture for a network of claim 1, wherein the shared storage includes a log that can be written to by the first server node and the second server node for recording the status of network.

3. The architecture for a network of claim 1, wherein the volume of the storage array are configured according to a fault tolerant data storage format.

4. The architecture for a network of claim 3, wherein the volume of the storage array are configured according to a RAID data storage format.

5. The architecture for a network of claim 1, wherein one of the storage management agent of the first server node or the storage management agent of the second server node is selected as a primary storage management agent to monitor the rebuild of a degraded volume.

6. The architecture for a network of claim 5, wherein the primary storage management agent is operable to recognize a degraded volume in the storage array and initiate the rebuild of the degraded volume if the rebuild has not been initiated within a defined wait period.

7. The architecture for a network of claim 6,
   wherein the rebuild of the degraded volume is performed by a storage controller in a server node; and
   wherein the primary management agent is operable to detect whether the server node that includes the storage controller that is performing the rebuild of the degraded volume has failed.

8. The architecture for a network of claim 7, wherein the role of the primary storage management agent is transferred to another storage management agent of another server node in the event of a failure of the server node that includes the primary storage management agent.

9. The architecture for a network of claim 8, wherein the shared storage includes a log that can be written to by the first server node and the second server node for recording the status of network.

10. The architecture for a network of claim 9, wherein the volume of the storage array is configured according to a RAID data storage format.

11. A method for managing the operation of a network, wherein the network comprises a plurality of server nodes, each of which includes a storage controller and each of which is coupled to shared storage that includes multiple drives organized as a plurality of storage volumes, comprising:
    providing a storage management software agent in each server node;
    providing a communications link between each storage management software agent, wherein each storage management software agent is operable to communicate and synchronize with each other through the communications link;
    selecting one of the storage management agents to serve as the primary storage management software agent;
    monitoring at the primary storage management agent the storage volumes in shared storage;
    identifying a degraded RAID volume in shared storage;
    waiting for a first period to determine if a rebuild of the RAID volume has been initiated; and
    initiating the rebuild of the RAID volume if a rebuild is not initiated within the first waiting period.

12. The method for managing the operation of a network of claim 11, further comprising:
    waiting a second period to determine if the rebuild of the volume is complete; and
    if the rebuild of the volume is not complete by the conclusion of the second waiting period, determining if a server node of the network that is managing the rebuild of the volume has failed.

13. The method for managing the operation of a network of claim 12, further comprising the step of transitioning the operations of the failed server node to an alternate server node if it is determined that a server node of the network that is managing the rebuild of the volume has failed.

14. The method for managing the operation of a network of claim 11, wherein the shared storage includes a storage log that is accessible by each storage management agent and wherein the storage management agents write the status of the storage array to the storage log.

15. The method for managing the operation of a network of claim 11, wherein the volumes of the storage array are configured according to a fault tolerant data storage format.

16. The method for managing the operation of a network of claim 15, wherein the volumes of the storage array are configured according to a RAID data storage format.

17. A method for managing the operation of a network, wherein the network comprises a plurality of server nodes, each of which is coupled to shared storage that includes multiple drives organized into a storage volumes, comprising:
    monitoring the volumes;

identifying a degraded volume among the drives of the storage array;

waiting for a first period to determine if a rebuild of the volume has been initiated;

initiating the rebuild of the volume if a rebuild is not initiated within the first waiting period; and wherein the server nodes are communicatively coupled through a communications link to each other and are operable to synchronize with each other through the communications link.

18. The method for managing the operation of a network of claim 17, further comprising:

waiting a second period to determine if the rebuild of the volume is complete; and if the rebuild of the volume is not complete by the conclusion of the second waiting period, determining if a server node of the network has failed.

19. The method for managing the operation of a network of claim 18, further comprising the step of transitioning the rebuild operations of the failed server node to an alternate server node if it is determined that a server node of the network that is managing the rebuild of the volume has failed.

20. The method for managing the operation of a network of claim 18, further comprising the step of periodically writing the status of the array to a shared storage area accessible by each server node.

* * * * *